United States Patent Office 3,334,075
Patented Aug. 1, 1967

3,334,075
MULTIMALEIMIDE CURE OF HALOGENATED ISOOLEFIN-MULTIOLEFIN COPOLYMERS
John T. Kehn, Roselle, N.J., assignor to Esso Research and Engineering Company, a corporation of Delaware
No Drawing. Filed Oct. 23, 1964, Ser. No. 406,156
21 Claims. (Cl. 260—85.3)

The present invention relates to an improved method for curing halogenated isoolefin-multiolefin copolymers or blends of halogenated isoolefin-multiolefin copolymers and high unsaturated rubbery polymers and also relates to the novel compositions produced thereby. The present invention further relates to improvements in laminated articles and particularly relates to the bonding and/or lamination of said halogenated isoolefin-multiolefin copolymers or blends thereof to high unsaturated rubbers, e.g., natural rubber, butadiene-styrene (SBR) rubber, polybutadiene, etc. More particularly, this invention relates to the curing of halogenated butyl rubber with a multimaleimide. This invention is particularly applicable to the bonding of a chlorinated butyl rubber tread to an auto tire carcass made of natural rubber, SBR, or blends thereof.

In the fabrication of various rubber articles, such as conveyor belts and automotive tires, it is frequently desirable to make one portion of the article from one type of rubber and the other portion from some other type of rubber. An example of the foregoing type of bonding between dissimilar rubbery materials is the production of pneumatic tires. Here, it is necessary to form an adequate and firm bond between inner linings, treads or sidewalls, prepared from a relatively low unsaturated rubber, e.g., butyl rubber, and a high unsaturated rubbery material, such as diene-styrene copolymers, natural rubber, other high unsaturated rubbers, and mixtures thereof from which the carcass is ordinarily prepared.

Natural rubber, SBR rubber, acrylonitrile-butadiene (NBR) rubber and other high unsaturated rubbers differ greatly from butyl rubber in their chemical and physical properties as well as in their respective reactions to compounding, filling and vulcanizing agents. It is virtually impossible to adhere these dissimilar rubbery materials securely to each other by conventional methods used in laminating rubber-like materials having similar properties. This is probably due to the fact that high unsaturated rubbers tend to react preferentially with the vulcanizing agents, thus robbing the butyl of its curatives. The result is an undercured layer of butyl rubber next to an overcured layer of high unsaturated rubber. This is reflected by poor bonds in laminated structures, sponging or blowing in blend vulcanizates and delamination under dynamic stress.

Many attempts have been made to adhere chlorinated butyl rubber inner liners to tire carcasses containing high unsaturated rubbery polymers and copolymers by means of a single tie gum. For instance, the use of layers containing blends of 15-85 wt. percent of high unsaturated rubbers and 15-85 wt. percent of chlorinated butyl rubber, interposed between the inner liner and carcass, have been tried without substantially increasing the adhesion of the liner to the carcass. It has also been proposed to unite a butyl rubber tread and a high unsaturated rubber carcass by a system of strips (tie gums) of rubbery material so formulated that the tie gum adjacent to the tread will adhere to the tread, the tie gum adjacent to the outer carcass will adhere to the carcass and both strips forming the tie gum system will adhere to one another. However, difficulty has been experienced in obtaining satisfactory application of these tie gums to their respective components so as to protect the splice joints of these components from contact with the non-compatible rubber of the complementary component.

The present invention overcomes the foregoing difficulties and affords a means by which a halogenated butyl rubber can be securely bonded to a high unsaturated rubbery material, such as natural rubber.

Dimaleimides have previously been used to accelerate the peroxide cure of natural and butadiene-styrene rubbers. See, for example, J. Am. Chem. Soc., 81, 1190–94 (1959). Dimaleimides have also been utilized to accelerate the rate of cross-linking of high unsaturated synthetic rubbers, such as natural rubber, polybutadiene rubber, SBR rubber, and polyisoprene, under the action of ionizing radiation. See, J. Polymer Sci., part A vol. 1, pp. 2537–49, 1963, and J. Polymer Sci., vol. 58, pp. 737–54 (1962). More recently, it has been proposed to cure unhalogenated butyl rubber by the combined action of a free radical generator, such as an organic peroxide, and a free radical acceptor, such as a dimaleimide. See U.S. Patent 2,925,407 and J. Applied Polymer Sci., vol. 8, pp. 2281–2298, 1964. It has also been proposed to increase the modulus of elasticity of unhalogenated butyl rubber by heating a copolymer of isobutylene and a diolefin in the presence of a nitrosoarylaminomethylimide such as N-(p-nitrosoanilinomethyl)-maleimide. See U.S. Patent 3,036,051. It has since been found that the peroxide-dimaleimide cure of unhalogenated butyl rubber under conventional conditions, i.e., a temperature of between 287° F. and 320° F. for a time of between 15 and 90 minutes, results in unsatisfactory vulcanizates. It is, therefore, surprising to find that halogenated butyl rubber can be cured with a multimaleimide in the absence of a free radical generator.

It is, therefore, an object of the present invention to provide an improved cure system for halogenated isoolefin-multiolefin rubbery copolymers, referred to broadly as butyl rubber. It is a further object of the present invention to provide a means by which halogenated isoolefin-multiolefin copolymers can be bonded to high unsaturated rubbers to provide a lasting laminated material. A still further object of the present invention is to provide increased compatibility between halogenated isoolefin-multiolefin copolymers and rubbery polymers of high unsaturation. These and other objects, as well as the advantages of the present invention, will become clear from the following description and examples.

According to the present invention, halogenated isoolefin-multiolefin copolymers are compounded with between about 0.2 and about 20 parts of a multimaleimide, per 100 parts of rubbery copolymer, and cured at a temperature of between about 250° F. and about 450° F. for between about 10 minutes and about 3 hours or more. In another feature of the present process, the halogenated isoolefin-multiolefin copolymer is compounded with a multimaleimide and applied to a conventionally compounded but uncured, high unsaturated rubber surface. The resulting laminate can thereafter be compressed and cured at the foregoing temperatures and times to produce a high-strength union, junction or weld. When the halogenated isoolefin-multiolefin copolymer is brominated butyl rubber, excellent vulcanizates are obtained by using a multimaleimide as the sole vulcanizing agent. When multimaleimides are utilized as the sole vulcanizing agent for chlorinated butyl rubber, acceptable vulcanizates result only after an extended curing period. It has, however, been found that the rate of multimaleimide cure of chlorinated butyl rubber can be accelerated by utilizing between about 0.2 and about 20 parts of zinc oxide, per 100 parts of rubbery polymer, in addition to the multimaleimide. Butyl rubber comprises a copolymer of a major proportion, advantageously about 70–99.9 wt. percent, preferably 85–99.5 wt percent, of a $C_4$–$C_8$ isoolefin, such as isobutylene, with a minor proportion, advantageously about 30–0.1 wt. percent, preferably 15–0.5 wt. percent, of a $C_4$–$C_{14}$ multiolefin, preferably a $C_4$–$C_8$ diolefin, such as butadiene, dimethylbutadiene, piperylene, isoprene, allocimene and the like; isoprene is preferred. The preferred polymer is obtained by reacting between about 95 and about 99.5 wt. percent of isobutylene, with between about 0.5 and about 5 wt. percent of isoprene. Cyclodiolefinic compounds such as cyclopentadiene and methylcyclopentadiene as well as compounds such as divinylbenzene, fulvene, and β-pinene may be incorporated with the isoolefin either in addition to the diolefin or in place of the diolefin. These additional compounds may be incorporated in amounts up to about 6 wt. percent based on isoolefin, preferably in amounts of between about 0.3 wt. percent and about 2.0 wt. percent. The preparation of butyl-type rubbers is described in chapter 24 of Synthetic Rubber by G. S. Whitby (Editor-in-Chief), John Wiley & Sons, 1954, as well as in U.S. Patent 2,356,128 to Thomas et al, inter alia.

In producing halogenated butyl rubber, unmodified, unvulcanized butyl rubber is halogenated so as to preferably contain about at least 0.5 wt. percent, more preferably at least about 1.0 wt. percent combined halogen but not more than about X wt. percent combined chlorine or 3X wt. percent combined bromine wherein:

$$X = \frac{M_3 L}{(100-1)M_1 + L(M_2 + M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 wt. percent of combined halogen in the polymer but not more than about one atom of chlorine or three atoms, preferably two atoms, of bromine combined in the polymer per molecule of multiolefin present therein; i.e., not more than about one atom of combined chlorine or three atoms of combined bromine per double bond in the polymer.

Suitable halogenating agents which may be employed are gaseous chlorine, liquid bromine, iodine monochloride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromosuccinimide, alpha-chloroacetoacetanilide, tribromophenol bromide, N-chloracetamide, N-bromophthalimide, N,N'-dimethyl-5,5-dichloro or dibromohydantoin, and other common halogenating agents.

The halogenation is generally conducted at between about $-50°$ C. and about $+150°$ C., advantageously between about $0°$ C. and about $65°$ C., preferably between about $20°$ C. and about $50°$ C. (room temperature being satisfactory) depending upon the particular halogenating agent, for between about one minute and about several hours. An advantageous pressure range is between about 0.5 and about 400 p.s.i., atmospheric pressure being satisfactory. The halogenation conditions can be regulated to halogenate the rubbery copolymer to the extent above mentioned. The halogenated copolymer formed advantageously has a viscosity average molecular weight (Mν) of between about 150,000 and about 1,500,000 and a mole percent unsaturation of between about 0.5% and about 15.0%, preferably between about 0.6% and about 5.0%. The preparation of halogenated butyl rubber is described more fully in U.S. Patent 2,944,578 to Baldwin et al. which is herein incorporated by reference.

In still another feature of the present process, halogenated butyl rubber can be blended with between about 10 and about 80 wt. percent, preferably between about 20 and about 40 wt. percent, of a high unsaturated rubber and cured with a multimaleimide at conventional temperatures and times. By high unsaturated rubber is meant a rubber having an iodine number of between about 200 and about 700. Examples of rubbers falling within this category are natural rubber or polyisoprene, butadiene-styrene rubber (SBR), polybutadiene, and acrylonitrile-butadiene rubber (NBR). Preparation of the aforementioned synthetic rubbers is fully discussed in chapters 7 and 23 of the aforementioned reference text, Synthetic Rubber by G. S. Whitby.

In addition to the conventional halogenated butyl rubbers, dehydrohalogenated butyl rubbers can also be utilized in the present novel process. Dehydrohalogenated butyl rubbers can be prepared by subjecting the halogenated material to heat and/or the action of basic materials which accept hydrogen halides, such as magnesium oxide of calcium oxide. Dehydrohalogenation can occur during vulcanization or in a separate hot mixing step which is generally performed at a temperature above $300°$ F. for a period of between about 1 minute and about 20 minutes. Dehydrohalogenated butyl rubbers are, however, not preferred for the reason that they tend to readily scorch and cure at room temperature when compounded with a multimaleimide.

The multimaleimides utilized in the cure system of the present process can generally be described as any organic compound containing at least two N-substituted maleimido radicals. The maleimido group hereinafter designated M for conciseness, is represented by the following structural formula:

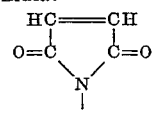

In particular, representative multimaleimides can be represented empirically by the following three formulae:

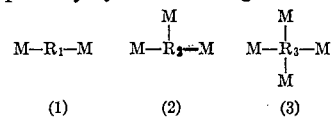

wherein M is the N-substituted maleimido radical, as defined hereinabove, $R_1$ is a divalent organic or inorganic radical selected from the group consisting of sulfur, nitrogen and divalent acyclic, alicyclic, aromatic and heterocyclic divalent radicals, and $R_2$ and $R_3$ are respectively trivalent and tetravalent organic radicals selected respectively from the group consisting of trivalent and tetravalent acyclic, alicyclic, aromatic and heterocyclic radicals. The curing activity of the multimaleimides in halogenated butyl rubber is believed to be attributable solely to the activity of the maleimido radical and therefore the organic or inorganic bridge, i.e., $R_1$, $R_2$ and $R_3$, functions only to join the maleimido radicals. Thus, the critical aspect of the above-defined maleimides is that they have at least two N-substituted maleimido groups per molecule.

Of the multimaleimides utilizable in the present novel process, the dimaleimides, corresponding to the empirical formula $M-R_1-M$, are the most readily available and are preferred. Whereas $R_1$ can be any divalent organic or inorganic radical which suitably connects the maleimido radicals, it is desirably selected from any of the following:

(a) A saturated acyclic alkylene radical of from 1 to 16 carbon atoms, such as methylene, ethylene, 1,2- and 1,3 - propylene, 1,4 - tetramethylene, 1,6 - hexamethylene, 2,2,6,6-tetramethyl 1,7-heptylene, 1,10 - decamethylene, 1,16-hexadecamethylene, 2-methyl 1,3 - propylene and 2,2-dimethyl 1,3-propylene, (b) An unsaturated acyclic alkenylene radical of from 2 to 16 carbon atoms, such as vinylene, propenylene, 1,4 butenyl-2-ene, 1,6-hexenyl-3-ene, and 1,10-decenyl 3-ene.

(c) A $C_6$ to $C_{20}$ arylene or biarylene radical such as ortho, meta and para phenylene, 4,4'-biphenylene, 1,4-; 1,5-; 2,6- and 1,8-naphthylene and 4,4'-binaphthylene;

(d) A $C_1$ to $C_4$ alkyl substituted $C_6$ to $C_{20}$ arylene radical such as 4-methyl-m-phenylene, 4-t-butyl m-phenylene, 2-methyl-p-phenylene and 2,6-dimethyl 1,5-naphthylene;

(e) A disubstituted dialkylene aromatic radical of from $C_8$ to $C_{20}$ carbon atoms such as a,a'-ortho, meta and para xylylene and 2,6-dimethylene naphthylene;

(f) A diarylene substituted alkylene radical having a total number of carbon atoms of from $C_{11}$ to $C_{20}$ such as 4,4' diphenylene methane and 4,4' diphenylene dimethyl methane;

(g) A $C_4$ to $C_{12}$ saturated alicyclic alkylene radical such as 1,3-cyclobutylene, 1,3-cyclopentylene and 1,4-cyclohexylene;

(h) A $C_1$ to $C_4$ alkyl substituted $C_4$ to $C_{12}$ saturated alicyclic alkylene radical such as 1,8-methylene a,a' hexahydroxylylene, 1,2-dimethylene cyclobutane and 1,3 dimethylene cyclopentane;

(i) A divalent radical from a bridged-ring saturated alicyclic compound of $C_7$ to $C_{12}$ carbon atoms, such as 2,5-bicyclo(2,2,1) heptylene and 3,8-tricyclo$(5,2,1,0^{2,6})$ decylene;

(j) Sufur or disulfido radical;

(k) Bis oxymethylene, bis oxyethylene, or bis oxypropylene derivatives of glycols such as: 2,5-dioxahexylene, 3,6-dioxaoctylene, 4,7-dioxadecylene and 6-methyl, 4,8-dioxahendecylene;

(l) Divalent dialkylene amines and trialkylene diamines such as diethylene amine and triethylene diamine; and (m) Diarylene ethers, thioethers and amines such as 4,4' diphenylene ether, 4,4' diphenylene sulfide and 4,4' diphenylene amine.

Representative examples of dimaleimides corresponding to the empirical formula M—$R_1$—M include:

1,6-dimaleimidohexane,
1,12-dimaleimido dodecene-6,
1,3-dimaleimidobenzene,
2-methyl,
1,4-dimaleimidobenzene,
a,a' dimaleimido meta xylene,
4,4'-dimaleimido diphenyl dimethyl methane,
1,3-dimaleimido cyclohexane,
1,8-dimaleimido menthane,
2,5-dimaleimido norbornane,
thio-dimaleimide,
bis(maleimido oxymethyl)ethane,
dimaleimido diethylene amine,
dimaleimido triethylene diamine,
4,4'-dimaleimido-diphenyl ether,
4,4'-dimaleimido diphenyl sulfide,
4,4'-dimaleimido diphenylamine,
N,N'-dimaleimide,
1,16-dimaleimido hexadec-8-ene,
N,N'-phenylene-1,4-bismaleimide,
4,4'-dimaleimido biphenyl,
4,4'-bis(maleimidophenyl) methane,
1,3-bismaleimido cyclobutane,
1,4-bis(maleimidomethyl) cyclohexane, and
dithiodimaleimide.

Trimaleimides utilizable in the present novel process can be represented by the following empirical formula:

wherein M is the maleimido radical and $R_2$ is any suitable trivalent organic radical. $R_2$ is preferably selected from any of the following:

(n) Trisubstituted $C_3$ to $C_{20}$ alkanes, which can in part be represented structurally by the following representative formulae:

(1) 

(2) 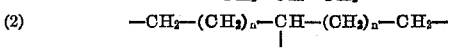

wherein $n$ is a cardinal number of from 0 to 9;

(3) 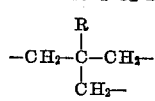

wherein R is selected from the group consisting of hydrogen, $C_1$ to $C_{16}$ alkyl and cycloalkyl, and $C_6$ to $C_{16}$ aryl and alkaryl;

(4) 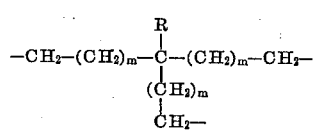

wherein $m$ is a cardinal number of from 0 to 6 and R is defined as above.

(o) Trisubstituted $C_9$ to $C_{20}$ alicyclic hydrocarbons, which can in part be represented structurally by the following representative formulae:

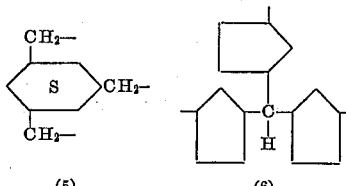

(5)        (6)

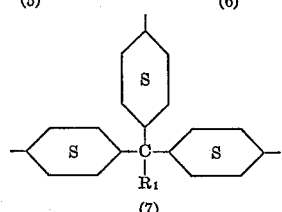

(7)

wherein $R_1$ is selected from the group consisting of hydrogen and methyl.

(p) Trisubstituted $C_6$ and $C_{20}$ aromatic hydrocarbons which can in part be represented structurally by the following representative formulae:

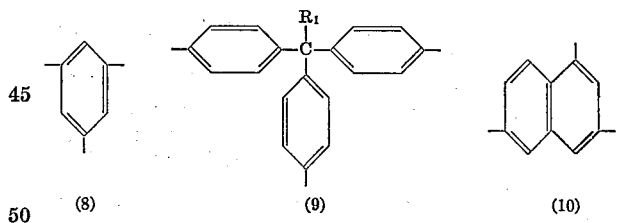

(8)      (9)      (10)

wherein $R_1$ is selected from the group consisting of hydrogen and methyl.

(q) Trisalkoxyalkanes of from 6 to 20 carbon atoms which can in part be represented structurally by the following representative formulae:

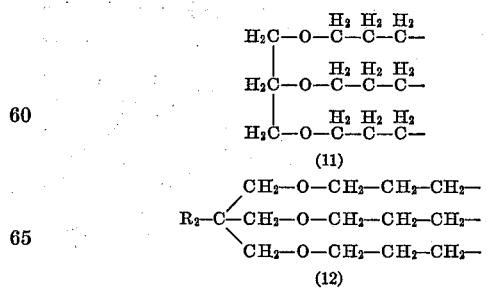

wherein $R_2$ is selected from the group consisting of hydrogen and $C_1$ to $C_7$ alkyl.

Tetramaleimides which can be utilized in the present novel process can be represented by the following empirical formula:

wherein M is the maleimido radical and $R_3$ is any suitable tetravalent organic radical. $R_3$ is preferably selected from any of the following:

(r) Tetrasubstituted $C_4$ to $C_{20}$ alkanes, which can in part be represented structurally by the following representative formulae:

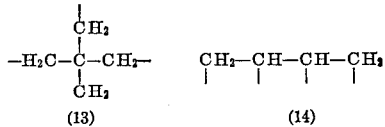

(13)    (14)

(s) Tetrakisalkoxy alkanes of from 8 to 20 carbon atoms, which can in part be represented structurally by the following representative formula:

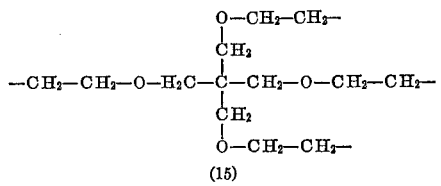

(15)

Representative examples of tri- and tetramaleimides include: 1,2,3-trimaleimidopropane, tris(maleimidomethyl) methane, tris(maleimidoethyl) methane, 1,3,5-tris(maleimidomethyl) cyclohexane, tri-4,4',4''-(maleimidocyclohexyl) methane, 1,3,5-trimaleimido benzene, 4,4',4''-tris (maleimidophenyl) methane, 1,4,6-trimaleimido naphthalene, tris(3-maleimidopropyl oxymethyl) methane, tris-1,2,3-(maleimidooxymethyl) propane, tris(maleimidomethyl) ethyl methane, tetrakis (maleimidomethyl) methane, 1,1,2,2-tetrakis (maleimidomethyl) ethane, 1,2,3,4-tetramaleimido butane, tetrakis(3-maleimido propyl oxymethyl) methane and tetrakis (maleimidomethyl oxymethyl) methane.

Multimaleimides can be synthesized according to the method of Searle, which briefly comprises reacting a 25% molar excess of maleic anhydride at about 15–20° C. with a primary polyamine or polyamide chosen to form the desired bridge between the maleimido radicals; thus forming the intermediate maleamic acid. This acid is recovered, dried and reacted with an excess of acetic anhydride in the presence of fused sodium acetate at about 80–95° C. The resultant multimaleimide is recovered by precipitation in ice water, filtering and drying. A more complete description of the aforementioned process for the preparation of maleimides can be found in U.S. Patents 2,444,536 and 2,462,835.

As heretofore recited, a preferred embodiment of the present process is the combined use of zinc oxide and a multimaleimide with chlorinated butyl rubber. It has been found that zinc oxide accelerates the multimaleimide cure of chlorinated butyl rubber and that other heavy metal oxides ordinarily used in the compounding of rubber stocks such as calicum oxide, magnesium oxide, zinc chloride and the like do not substantially accelerate the vulcanization process.

In practicing the present novel process, halogenated butyl rubber is compounded by mixing on a rubber mill, per 100 parts by weight of halogenated polymer, between about 0.2 and about 20 parts, preferably between about 2 and about 6 parts, of a multimaleimide compound. When zinc oxide is utilized it is added in an amount of between about 0.2 and about 20 parts, preferably between about 0.25 and about 1.0 part, per 100 parts by weight of halogenated polymer. In addition, between about 0 and about 100, preferably between about 20 and about 60, parts by weight of a filler, such as clay, silica, silica-alumina, carbon black and hydrated silica, as well as conventional accelerators, tackifiers, antioxidants, extender oils, pigments, etc., may be compounded with the synthetic polymer. Other conventional compounding and vulcanizing agents may be used for various special applications. When utilizing the compound halogenated butyl rubber as a cement composition, the solvent employed can be any one or more of the following: substituted and unsubstituted $C_6$–$C_{13}$ aliphatic and aromatic hydrocarbon solvents such as hexane, decane, benzene, carbon tetrachloride, carbon disulfide, cyclohexane, xylene, chlorobenzene, ethylene dichloride, etc.

The compounded, halogenated butyl rubber polymer is formed into any desired shape, which may include any of the usual methods for the processing of rubber or rubber substances including extruding and calendering. The compounded rubbery polymer is then cured at a temperature of between about 250° F. and about 450° F. and preferably between about 280° F. and about 320° F. for a time interval ranging between about 10 minutes and about 3 hours or more, but preferably between about 15 minutes and about 60 minutes.

The high unsaturated rubbery polymers utilized in the present process are compounded with conventional ingredients and in accordance with accepted procedures, i.e., using carbon blacks, accelerators, tackifiers, sulfur, antioxidants, extender oils, etc. In blending the halogenated butyl rubbers of the instant process with high unsaturated rubbery polymers, between about 20 and about 90 wt. percent, preferably between about 60 and about 80 wt. percent, of halogenated butyl rubber is blended with between about 80 and about 10 wt. percent, preferably between about 40 and about 20 wt. percent, of a high unsaturated rubber. These blends can be prepared by simply admixing the respective rubbers on a mill or in a mixer followed by the addition of compounding ingredients.

In producing laminated rubber compositions from two dissimilar rubbers or blends of rubbers, the two dissimilar rubbery materials are separately compounded and then united and compressed at pressures of between about 50 p.s.i.g. and about 2,000 p.s.i.g., advantageously between about 1,000 p.s.i.g. and about 1,500 p.s.i.g., by any suitable means, such as in a rubber press, and simultaneously vulcanized at temperatures of between about 250° F. and about 450° F., preferably between about 280° F. and about 320° F. for a time period of between about 10 minutes and 3 hours or more, e.g., between 15 minutes and 60 minutes.

The above procedure can be employed to produce superior laminated materials suitable for use in constructing tires for automobiles, trucks, tractors, airplanes, etc. e.g., for adhering a halogenated butyl tread or sidewall or air-retaining inner liner to a tire carcass formed of SBR rubber, natural rubber, or mixtures thereof, as well as for numerous other uses such as for conveyor or drive belts and other products built up of a plurality of laminates of dissimilar rubbery materials. This procedure is especially applicable to such products which have at least one layer of halogenated butyl rubber or blends thereof.

The multimaleimide-compounded halogenated butyl rubbers of the present process can also be adhered to siliceous surfaces, e.g., glass fibers, or silica filler surfaces. Briefly, the glass fiber or silica filler surface is treated with a substituted alkyl-silane, e.g., aminopropyl triethoxysilane, mercaptopropyl trimethoxysilane, or glycidoxypropyl trimethoxysilane. The treated glass fiber or silica surface is then coated with a layer of multimaleimide-compounded halogenated butyl rubber. The rubbery polymer and silane finished glass are then contiguously placed in conventional vulcanizing equipment, e.g., a flat cavity mold, and heated at a temperature of between about 250° F. and about 400° F., preferably between about 300° F. and about 330° F. for a time period of between about 3 and about 120 minutes, preferably between about 10 and about 60 minutes, and cured under pressure of between about 5 and between about 1,000 p.s.i.g., preferably between about 50 and about 600 p.s.i.g.

The preparation, properties, compounding, vulcanization and use of the compositions of the present process are more fully set forth in the following examples which are intended as illustrative only since numerous modifications and variations therein will be apparent to those skilled in the art. For the sake of brevity, the adhesion aspects of the present novel cure system will, for the most part, be illustrated with a 50/50 blend of natural rubber and SBR rubber. However, unless otherwise stated, any of the other high unsaturated rubbers hereinbefore mentioned or blends thereof can be used to prepare the laminated compositions described herein.

The following test methods were employed to evaluate the properties of the formulated compounds presented in the ensuing examples. Tensile strength, elongation and modulus were evaluated according to ASTM method D412–51T. A Shore A Durometer, ASTM 676–58T, was used to determine the hardness of the vulcanizate. The adhesion of halogenated butyl rubber to high unsaturated rubbers was evaluated by preparing a spirally laminated pellet of the two rubbers (about 1 inch high and about ¾ inch in diameter), curing the pellet, and thereafter subjecting it to dynamic stress by means of a Goodrich Flexometer for a specified time period, e.g., 30 minutes, or until delamination occurred. See, ASTM D623–52T (Method A, at 212° F., stroke—0.25 inch, frequency—30 cycles/second, test duration—30 minutes). This test will hereafter be referred to as the Spiral Dynamic Adhesion (SDA) test. Mooney Scorch was ascertained according to ASTM D1646–59T run at 270° F. using the small (MS) rotor. Test specimens were warmed up one minute. Adhesion was further evaluated by means of the standwich adhesion test, which is similar to ASTM D413–39 except that the layers of the sandwich consist of the dissimilar rubbers to be tested and testing is done at elevated temperatures as well as room temperature. The state of crosslinking of the vulcanizates was determined by immersion of the sample in cyclohexane for 48 hours at 73.4° F. The increase in weight divided by the original dry weight and multiplied by 100 is called "percent weight swell."

$$\frac{(\text{Swollen wt.} - \text{dry wt.})}{\text{dry wt.}} \times 100$$

chemical and physical charactertistics of these three rubbers are as follows:

Butyl 218 is a commercial grade of unhalogenated butyl rubber which has a viscosity average molecular weight of between about 400,000 and about 600,000, a mole percent unsaturation of between about 1.5 and about 2.0 and a Mooney viscosity (ML 3 minutes at 260° F.) of between about 50 and about 60.

Chlorobutyl HT10–66 is a commercial grade of chlorinated butyl rubber which has a viscosity average molecular weight of between about 350,000 and about 400,000, a mole percent unsaturation of between about 1% and about 2%, a chlorine content of between about 1.1 wt. percent and about 1.3 wt. percent and a Mooney viscosity (ML 8 minutes at 212° F.) of between about 50 and about 60.

Bromobutyl MD–571 has a viscosity average molecular weight of between about 400,000 and about 500,000, a mole percent unsaturation of between about 1.7% and about 2.0%, a bromine content of between about 2 wt. percent and about 3.5 wt. percent and a Mooney viscosity (ML 8 minutes at 212° F.) of between about 60 and about 70.

*Example 1*

One hundred parts by weight of each of chlorobutyl HT10–66, bromobutyl MD–571, dehydrobrominated MD–571 and butyl 218 were compounded with selected amounts of N,N'-m-phenylene bismaleimide. Portions of each of the aforementioned compounded elastomeric materials were cured at 307° F. for periods ranging between 10 minutes and 180 minutes. After curing, portions of each of the resulting vulcanizates were placed in cyclohexene at 73.4° F. and the percent of weight swell after 48 hours was measured. The compounding and percent weight swell data for these runs are tabulated in Table I. Successful vulcanizates were obtained from these pure gum cures where the percent weight swell ranged between about 300 and about 700%.

TABLE I

| Ingredient (parts by weight) | 1 | 2 | 3 | 4 | 5 | 6 | 7 | 8 |
|---|---|---|---|---|---|---|---|---|
| Chlorobutyl HT 10–66 | 100 | 100 | | | | | | |
| Bromobutyl MD–571 | | | 100 | 100 | 100 | | | |
| Dehydrobrominated MD–571 * | | | | | | 100 | 100 | |
| Butyl 218 | | | | | | | | 100 |
| N,N'-m-phenylene bismaleimide | 4 | 10 | 4 | 10 | 0.5 | 10 | 4 | 10 |

| Cured at, min./° F.: | | | | | | | | |
|---|---|---|---|---|---|---|---|---|
| 10'/307° | No Cure | No Cure | 1,000 | 1,220 | | 430 | 490 | No Cure |
| 20'/307° | No Cure | | 460 | | | | | |
| 30'/307° | No Cure | No Cure | 380 | 470 | 630 | 370 | 400 | No Cure |
| 60'/307° | No Cure | No Cure | 320 | 320 | 630 | 310 | 360 | No Cure |
| 90'/307° | No Cure | | | | 680 | | | |
| 120'/307° | 1,540 | | | | 680 | | | |
| 180'/307° | 990 | | | | 730 | | | |

* Dehydrobrominated by hot milling a mixture of 100 parts MD–571 and 4 parts magnesium oxide for 12 minutes at 325° F.

The percent of swell for pure gum stocks, i.e., rubbery polymers compounded without fillers, should generally range between about 300% wt. increase and about 700% wt. increase. A figure below 300% indicates that the rubbery polymer has been overcured whereas a figure above 700% indicates that the rubbery polymer has been undercured, i.e., contains an insufficient number of cross linkages. When the rubbery polymer contains a filler, e.g., 50 parts of carbon black, the amount of swell desirably ranges between about 150% and about 300%.

In the ensuing examples, essentially three types of butyl rubber, designated butyl 218, chlorobutyl HT10–66, and bromobutyl MD–571 respectively, are utilized. The The data in Table I show that chlorobutyl rubber cures very slowly when m-phenylene bis maleimide is the sole curative. The data further show that bromobutyl and dehydrobrominated butyl rubbers give excellent vulcanizates when cured solely with m-phenylene bismaleimide. Unhalogenated butyl failed to cure at all.

*Example 2*

In order to further show the functionality of the multimaleimide cure system with chlorinated butyl rubber, Chlorobutyl HT10-66 was compounded with carbon black fillers and other conventional compounding ingredients and cured for various time intervals at 307° F. Portions of the resulting vulcanizates were then subjected to immersion in cyclohexane at 73.4° F. Useful vulcanizates of elastomers compounded with 50 parts of carbon black filler show a weight swell range of between about 150 and about 300%. Data for these runs appear in Table II.

*Example 3*

A chlorobutyl rubber was compounded with conventional compounding ingredients and cured with a combination of zinc oxide and N,N'-m-phenylene bismaleimide at 307° F. for 30 minutes. The resulting vulcanizates were then tested for tensile, modulus, elongation and hardness in accordance with the standard ASTM test methods heretofore described. Data for these runs appear in Table III.

TABLE III

| Ingredient (Parts by Weight) | 1 | 2 | 3 | 4 | 5 |
|---|---|---|---|---|---|
| Chlorobutyl HT10-66 | 100 | 100 | 100 | 100 | 100 |
| FT Black | 30 | 30 | 30 | 30 | 30 |
| FEF Black | 30 | 30 | 30 | 30 | 30 |
| Necton 60 [1] | 10 | 10 | 10 | 10 | 10 |
| Stearic Acid | 1 | 1 | 1 | 1 | 1 |
| Antioxidant 2246 [2] | 1 | 1 | 1 | 1 | 1 |
| N,N'-m-phenylene bismaleimide | 4.2 | | 4.2 | 2.1 | 4.2 |
| Zinc oxide | | 5.2 | 1.57 | 5.2 | 5.2 |
| Vulcanizate Properties (30 minute cure at 307° F.): | | | | | |
| Tensile, p.s.i. | No Cure | 1,860 | 1,670 | 1,650 | 1,710 |
| Modulus (100%), p.s.i. | No Cure | 120 | 430 | 300 | 410 |
| Elongation, percent | No Cure | 530 | 240 | 290 | 250 |
| Hardness, Shore A | No Cure | 53 | 65 | 62 | 64 |

[1] A refined naphthenic oil of about 60 sec. (57.3) viscosity (SSU) at 210° F., an aniline point of 216° F., and specific gravity of 0.8990 at 60° F.
[2] 2,2'-methylene-bis(4-methyl-6-t-butyl phenol).

TABLE II

| Ingredient (parts by weight) | 1 | 2 | 3 |
|---|---|---|---|
| Chlorobutyl HT 10-66 | 100 | 100 | 100 |
| EPC Black | 30 | 30 | 30 |
| SRF Black | 20 | 20 | 20 |
| Amberol ST-137X [1] | 5 | 5 | 5 |
| Stearic Acid | 1 | 1 | 1 |
| N,N'-m-phenylene bismaleimide | 4 | | 4 |
| Zinc Oxide | | 5 | 5 |
| Wt. Swell, percent in Cyclohexane | | | |
| Cured at, min./° F.: | | | |
| 20'/307° | No cure | 240 | 150 |
| 40'/307° | 490 | 210 | 130 |
| 60'/307° | 360 | 210 | 130 |
| 90'/307° | 260 | 200 | 120 |

[1] Non-reactive polymethylolphenol resin.

The data of Table II show that useful vulcanizates of carbon black filled chlorobutyl rubber cured with only a mulitimaleimide are obtained with a 90 minute cure at 307° F. However, the zinc oxide is used in combination with the multimaleimide, tightly cured vulcanizates are obtained in only 20 minutes.

The data in Table III shown that the addition of a multimaleimide to a zinc oxide cure of chlorobutyl HT10-66 improves the cure state, as shown by the modulus increase of runs 4 and 5 compared to that of run 2. Since the multimaleimide alone does not vulcanize chlorobutyl under these conditions (run 1), the combination of the multimaleimide and zinc oxide gives a surprisingly high state of crosslinking as measured by modulus. These data confirm by stress-strain measurements the high rate of crosslinking shown in Example 2 by weight swell measurements.

*Example 4*

In order to illustrate the unique functionality of zinc oxide in the multimaleimide cure of chlorobutyl rubber, a chlorobutyl master batch was prepared and portions thereof cured with various combinations of N,N'-m-phenylene bismaleimide and other accelerating compounds. Each of the resulting vulcanizates were then tested for tensile strength, modulus, elongation and hardness. Data for these runs appear in Table IV.

TABLE IV

| Ingredient (Parts by weight) | 1 | 2 | 3 | 4 | 5 | 6 | 7 |
|---|---|---|---|---|---|---|---|
| Chlorobutyl HT10-66 | 100 | 100 | 100 | 100 | 100 | 100 | 100 |
| EPC Black | 30 | 30 | 30 | 30 | 30 | 30 | 30 |
| SRF Black | 20 | 20 | 20 | 20 | 20 | 20 | 20 |
| Amberol ST-137X | 5 | 5 | 5 | 5 | 5 | 5 | 5 |
| Stearic Acid | 1 | 1 | 1 | 1 | 1 | 1 | 1 |
| N,N'-m-phenylene bismaleimide | 4 | 4 | 4 | 4 | 4 | 4 | 4 |
| Zinc Oxide (ZnO) | | 0.25 | | | | | |
| Zinc Chloride (ZnCl$_2$) | | | 0.25 | | | | |
| Ferric Chloride (FeCl$_3$) | | | | 0.25 | | | |
| Magnesium Oxide (MgO) | | | | | 0.25 | | |
| Calcium Oxide (CaO) | | | | | | 0.25 | |
| Cuprous Oxide (CuO) | | | | | | | 0.25 |
| Vulcanizate properties (30 min. cure at 307° F.): | | | | | | | |
| Tensile, p.s.i. | No Cure | 2,130 | 1,200 | 880 | No Cure | No Cure | No Cure |
| Modulus (300%), p.s.i. | No Cure | 800 | 280 | 180 | No Cure | No Cure | No Cure |
| Elongation, percent | No Cure | 680 | 730 | 930 | No Cure | No Cure | No Cure |
| Hardness, Shore A | No Cure | 55 | 48 | 45 | No Cure | No Cure | No Cure |

The data in Table IV show that only the combination of zinc oxide and N,N'-m-phenylene bismaleimide yields a vulcanizate of suitable tensile, modulus and elongation. The other commonly used metal salts and oxides either prevent vulcanization completely or give weakly cross-linked vulcanizates.

Example 5

Portions of a bromobutyl master batch comprising per 100 parts of bromobutyl MD–571, 1 phr. stearic acid, 30 phr. EPC black, 20 phr. SRF black and 5 phr. Amberol ST–137X resin were compounded with various multi-maleimides and cured for 30 minutes at 307° F. The resulting vulcanizates were then tested for tensile strength, modulus, elongation and hardness according to standard ASTM methods. Compounding data and inspections of the physical properties of the vulcanizates are tabulated in Table V.

TABLE V

| Ingredient (parts by weight) | 1 | 2 | 3 |
| --- | --- | --- | --- |
| Bromobutyl Master batch | 156 | 156 | 156 |
| N, N'-m-phenylene bismaleimide | 1 | | |
| N, N'-2, 4-tolylene bismaleimide | | 1 | |
| 4, 4'-methylene bis (N-phenylmaleimide) | | | 1 |
| Vulcanizate properties (30 min. cure at 307° F.): | | | |
| Tensile strength, p.s.i | 2,270 | 2,100 | 2,230 |
| Modulus (300%), p.s.i | 930 | 320 | 920 |
| Elongation, percent | 570 | 580 | 610 |
| Hardness, Shore A | 53 | 55 | 50 |

The data in Table V show that very similar results are obtained with various multimaleimides.

Example 6

In accordance with the procedure of Example 5, about 4 parts of each of various multimaleimides are compounded with 156 parts of a similar bromobutyl master batch and cured for 3 minutes at 307° F. Vulcanizates similar in physical properties to those shown in Example 5 are obtained. The multimaleimides utilized are: N,N'-dimaleimide, 1,6-dimaleimido hexane, 1,16-dimaleimido hexadec-8-ene, N,N'-phenylene-1,4-bismaleimide, 4,4'-dimaleimido biphenyl, 4,4'-bis(maleimidophenyl) methane, 1,3-bismaleimido cyclobutane, 1,4-bis(maleimido methyl) cyclohexane, thiodimaleimide, dithiodimaleimide, dimaleimido diethylene amine, tris(maleimidomethyl) ethyl methane, and tetrakis(maleimidomethyl) methane.

Example 7

In order to illustrate that the maleimides of the present process must contain at least two maleimido radicals per molecule, 100 grams of bromobutyl MD–571 were cold mixed with 2 grams of maglite K magnesium oxide. This mixture was then hot milled for 13 minutes at 325° F., producing partially dehydrobrominated butyl. One hundred grams of the hot milled mixture were then mixed with 50 grams of SRF black. Forty-five grams of the resulting carbon black modified composition were then cold milled with 1.5 grams (5 phr.) of phenyl maleimide, a monomaleimide, and a cure was attempted at 307° F. for 30 minutes. No cure resulted. A portion of this mono-maleimidebromobutyl composition was recovered and cold milled with 1.2 grams (4 phr.) of N,N'-m-phenylene bismaleimide. A cure was again attempted at 307° F. for 30 minutes; however, no cure resulted. This material was recovered and cold milled with 5 phr. of zinc oxide and cured at 307° F. for 45 minutes. No cure resulted. Finally, 1.5 phr. of sulfur, 1.5 phr. of tetramethyl thiuram disulfide and 1 phr. of stearic acid were added to and cold milled with the aforesaid zinc oxide modified composition and cured at 307° F. for 30 minutes. A good cure resulted which had a 227% weight swell in cyclohexane. These results demonstrate that monomaleimides do not cure halogenated butyl rubber but apparently react with it. They also show that thereafter multimaleimides and zinc oxide employed as additives are ineffective to cure the reacted product but that sulfur can successfully cure the monomaleimide-halogenated butyl reaction product.

Example 8

In order to demonstrate the utility of the present cure system in promoting adhesion to high unsaturated rubbers, a master batch of Chlorobutyl HT10–66 and a master batch of a 50/50 natural rubber-SBR rubber blend were prepared. Compounding formulae for these two respective master batches are found in Table VI. Portions of the chlorobutyl master batch were compounded with various curatives, shown in Table VII, and cured at 307° F. for 30 minutes. Other uncured portions of the chlorobutyl master batch were calendered into strips and pressed with similar calendered strips of the natural rubber/SBR rubber blend in the form of a T. These T (sandwich adhesion test) specimens were then cured at 307° F. for 35 minutes. Thereafter, the test specimens were pulled apart at the rate of 2 inches per minute in a tension testing machine until the two dissimilar strips parted or until failure occurred in the rubber stock. The values given in Table VII for the results of this test are in pounds per inch, i.e., the average number of pounds of continuous pull required to separate a 1-inch wide sandwich of the two dissimilar elastomer compounds. Other calendered strips of the compounded chlorobutyl master batch were formed into spirally laminated pellets with similar strips of the natural rubber/SBR rubber blend. These pellets were cured at 307° F. for 35 minutes and subjected to the SDA test heretofore described in the Goodrich Flexometer under a load of 20 pounds for 30 minutes or until failure (delamination) occurred.

TABLE VI

| | Parts by wt. |
| --- | --- |
| (I) Chlorobutyl masterbatch: | |
| Chlorobutyl HT10–66 | 100 |
| Stearic acid | 1 |
| EPC Black | 30 |
| SRF Black | 20 |
| Amberol ST–137X | 5 |
| (II) 50/50-natural rubber/SBR rubber masterbatch: | |
| Natural rubber | 50 |
| SBR 1500 rubber [1] | 50 |
| FEF Black | 30 |
| EPC Black | 10 |
| Flexon 380 [2] | 5 |
| Stearic acid | 1 |
| Zinc oxide | 3 |
| Age Rite Stallite [3] | 1 |
| Sulfur | 2.5 |
| Amax [4] | 1.25 |
| MBTS [5] | 0.25 |

[1] Commercial butadiene-styrene rubber having the ASTM number 1500 and a Mooney viscosity (ML 4 min. at 212° F.) of between 46 and 58.
[2] A refined aromatic oil of about 95 sec. viscosity (SSU) at 210° F., an aniline point of 139° F., and a specific gravity of 0.9580 at 60° F.
[3] A mixture of octylated diphenylamines used as an antioxidant.
[4] N-oxydiethylene benzothiazole-2-sulfenamide.
[5] Benzothiazyl disulfide.

TABLE VII

| Ingredient (parts by weight) | 1 | 2 | 3 | 4 | 5 | 6 | 7 |
|---|---|---|---|---|---|---|---|
| Chlorobutyl Masterbatch | 156 | 156 | 156 | 156 | 156 | 156 | 156 |
| N,N'-m-phenylene bismaleimide | 2 | 1 | 4 | 4 | 4 | | |
| ZnO | 1 | 5 | 0.5 | 0.25 | 0.25 | 0.5 | 5 |
| Maglite K (MgO) | | | | | 0.25 | | |
| Tensile, p.s.i. | 1,450 | 1,530 | 1,570 | 2,100 | 1,530 | 1,810 | 2,330 |
| Modulus (300%), p.s.i. | | | | 1,150 | 500 | 600 | 800 |
| Elongation, percent | 140 | 280 | 270 | 610 | 760 | 600 | 580 |
| Shore A Hardness | 65 | 55 | 60 | 54 | 48 | 48 | 50 |
| Mooney Scorch at 270° F | 1 | 2 | 2 | 7 | 20 | | |
| Sandwich Adhesion Test, lb./in. (Adhesion to 50/50-NR/SBR Blend): | | | | | | | |
| Specimens pulled at— | | | | | | | |
| Room temperature (73.4° F.) | *12 | 13 | 22 | 20 | 50 | 40 | 15 |
| 212° F | *3 | 4 | *9 | 12 | *30 | 7 | 6 |
| Adhesion to 50/50-NR/SBR blend in Spiral Laminated GoodrichFlexometer Pellets (SDA Test): | | | | | | | |
| Flexed—20 lb. Load: | | | | | | | |
| Visual Inspection | Solid | | Solid | Failed | Failed | Failed | Failed |
| Time (minutes) | 30 | | 30 | 22 | 29 | 1 | 7 |

*Stock failure.

The data of Table VII show that multimaleimides improve the adhesion of halogenated butyl rubber to high unsaturated rubbers, under dynamic stress conditions. (Compare runs 1 through 5 to runs 6 and 7.)

Example 9

Chlorobutyl HT10–68 was blended with various amounts of high unsaturated rubbers and compounded with conventional ingredients. Portions of these blends were cured with and without N,N'-m-phenylene bismaleimide at 300° F. for 18 minutes. The resulting vulcanizates were tested for hardness and abrasion resistance. Compounding data and test results are tabulated in Table VIII.

TABLE VIII

| Ingredient (parts by weight) | 1 | 2 | 3 | 4 | 5 | 6 | 7 |
|---|---|---|---|---|---|---|---|
| Chlorobutyl HT10–68 [1] | 80 | 80 | 60 | 60 | 60 | 60 | (9) |
| Polybutadiene [2] | 27.5 | 27.5 | 34.4 | 34.4 | 34.4 | 34.4 | (9) |
| Polyisoprene [3] | | | 15 | 15 | 15 | 15 | (9) |
| ISAF Black | 45 | 45 | | | | | (9) |
| SAF Black | | | 45 | 45 | 60 | 60 | (9) |
| Flexon 845 [4] | 7.5 | 7.5 | 10 | 10 | 17 | 17 | (9) |
| Stearic Acid | 1.25 | 1.25 | 1 | 1 | 1 | 1 | (9) |
| Thermoflex A [5] | 0.75 | 0.75 | 0.75 | 0.75 | 0.75 | 0.75 | (9) |
| Amberol St-137X | 1.5 | 1.5 | 1.5 | 1.5 | 1.5 | 1.5 | (9) |
| Zinc Oxide | 5 | 5 | 5 | 5 | 5 | 5 | (9) |
| Spider Sulfur | 1 | 1 | 1.5 | 1.5 | 1.5 | 1.5 | (9) |
| MBTS [6] | 0.75 | 0.75 | 1.25 | 1.25 | 1.25 | 1.25 | (9) |
| Santocure NS [7] | 1 | 1 | 0.5 | 0.5 | 0.5 | 0.5 | (9) |
| SP 1055 Resin [8] | 1.5 | 1.5 | 1.5 | 1.5 | 1.5 | 1.5 | (9) |
| N,N'-m-phenylene bismaleimide | | 1.5 | | 1.5 | | 1.5 | (9) |
| Hardness, Shore A | 57 | 58 | 56 | 57 | 58 | 58 | 59 |
| Abrasion Resistance, gms. Abraded/Revolution of Grinding Wheel | 0.0196 | 0.0091 | 0.0179 | 0.0137 | 0.0141 | 0.0085 | 0.0090 |

[1] A commercial grade of chlorobutyl rubber with a higher Mooney Viscosity than Chlorobutyl HT10–66, i.e. (ML 8 min.at 212° F.) of 71.
[2] Amberol CB 441, an oil-extended polybutadiene elastomer containing 37.5 parts of a highly aromatic oil per 100 parts of elastomer.
[3] Natsyn 200, a syntheticpolyisoprene having a minimum cis 1-4 content of 95%.
[4] A paraffinic oil extender having a specific gravity of 0.865 and an aniline point of 216° F.
[5] A mixture of Phenyl- naphthylamine, N,N'-diphenyl-p-phenylene diamine and di-p-methoxydiphenylamine.
[6] Benzothiazyl disulfide.
[7] N-t-butyl-2-benzothiazole sulphenamide.
[8] Brominated phenol-formaldehyde resin.
[9] A commerical butadiene-styrene/polybutadiene tread stock (SBR/PBD Production Tire Thread Compound).

The data in Table VIII show that the abrasion resistance of blends of chlorobutyl rubber with high unsaturated rubbers is improved at no increase in hardness, by the inclusion of a multimaleimide in the compound blend.

While there are above described a number of specific embodiments of the present invention, it is obviously possible to produce other embodiments and various equivalent modifications and variations thereof without departing from the spirit of the invention.

Having set forth the general nature and specific embodiments of the present invention, the true scope is now particularly pointed out in the appended claims.

What is claimed is:
1. A rubbery vulcanizable composition of matter consisting essentially of, per 100 parts of a halogenated copolymer of between about 85 and about 99.5 wt. percent of a $C_4$–$C_8$ isoolefin and between about 15 and about 0.5 wt. percent of a $C_4$–$C_{14}$ multiolefin, between about 0.2 and about 20 parts of an organic compound containing at least two N-substituted maleimido radicals per molecule.
2. The rubbery composition of claim 1 wherein the organic multimaleimide compound is represented by the formulae:

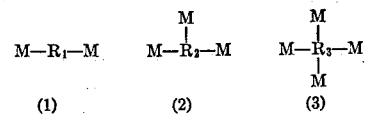

wherein M is are N-substituted maleimido radical,

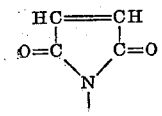

$R_1$ is a divalent radical selected from the group consisting of sulfur, nitrogen and divalent acyclic, alicyclic, aromatic and heterocyclic divalent radicals, and $R_2$ and $R_3$ are respectively trivalent and tetravalent organic radicals selected respectively from the group consisting of trivalent and tetravalent acyclic, alicyclic, aromatic and heterocyclic radicals.

3. The rubbery composition of claim 1 wherein the organic multimaleimide compound is N,N'-m-phenylene bismaleimide.

4. The rubbery composition of claim 1 wherein the isoolefin is isobutylene and the multiolefin is isoprene.

5. The rubbery composition of claim 1 wherein the halogenated isoolefin-multiolefin copolymer is selected from the group consisting of chlorinated and brominated copolymers of between about 85 and about 99.5 wt. percent of a $C_4$-$C_8$ isoolefin and between about 15 and about 0.5 wt. percent of a $C_4$-$C_8$ diolefin and wherein said halogenated copolymer contains at least 0.5 wt. percent of combined halogen and wherein the amount of halogen and the halogen are correlated and selected from the group consisting of not more than about 1 atom of combined chlorine per double bond in the copolymer and not more than about 3 atoms of combined bromine per double bond in the copolymer.

6. The rubbery composition of claim 5 wherein the organic multimaleimide compound is represented by the formula, M—$R_1$—M, wherein M is the N-substituted maleimido radical,

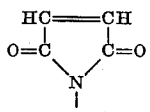

and $R_1$ is a divalent radical selected from the group consisting of sulfur, nitrogen and divalent acyclic, alicyclic, aromatic and heterocyclic radicals.

7. A rubbery vulcanizable composition of matter consisting essentially of, per 100 parts of a chlorinated copolymer of between about 85 and about 99.5 wt. percent of isobutylene and between about 15 and about 0.5 wt. percent of isoprene, between about 0.2 and about 20 parts of zinc oxide and between about 0.2 and about 20 parts of N,N'-m-phenylene bismaleimide.

8. A cured robbery composition of matter consisting essentially of, per 100 parts of a halogenated copolymer of between about 85 and about 99.5 wt. percent of a $C_4$-$C_8$ isoolefin and about 15 and about 0.5 wt. percent of a $C_4$-$C_{14}$ multiolefin, between about 0.2 and about 20 parts of an organic compound containing at least two N-substituted maleimido radicals per molecule, said rubbery composition having been cured at a temperature of between about 250° F. and about 450° F. for between about 10 minutes and about 3 hours.

9. The cured rubbery composition of claim 8 wherein the organic multimaleimide compound is represented by the formulae;

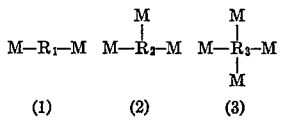

wherein M is the N-substituted maleimido radical

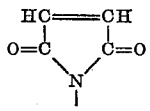

$R_1$ is a divalent radical selected from the group consisting of sulfur, nitrogen and divalent acyclic, alicyclic, aromatic and heterocyclic radicals and $R_2$ and $R_3$ are respectively trivalent and tetravalent organic radicals selected respectively from the group consisting of trivalent and tetravalent acyclic, alicyclic, aromatic and heterocyclic radicals.

10. The cured rubbery composition of claim 8 wherein the organic multimaleimide compound is N,N'-m-phenylene bismaleimide.

11. The cured rubbery composition of claim 8 wherein the isoolefin is isobutylene and the multiolefin is isoprene.

12. The cured rubbery composition of claim 8 wherein the halogenated isoolefin-multiolefin copolymer is selected from the group consisting of chlorinated and brominated copolymers of between about 85 and about 99.5 wt. percent of a $C_4$-$C_8$ isoolefin and between about 15 and about 0.5 wt. percent of a $C_4$-$C_8$ diolefin and wherein said halogenated copolymer contains at least 0.5 wt. percent of combined halogen and wherein the amount of halogen and the halogen are correlated and selected from the group consisting of not more than about 1 atom of combined chlorine per double bond in the copolymer and not more than about 3 atoms of combined bromine per double bond in the copolymer.

13. The cured rubbery composition of claim 12 wherein the organic multimaleimide compound is represented by the formula, M—$R_1$—M, wherein M is the N-substituted maleimido radical.

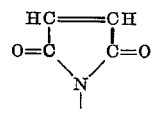

and $R_1$ is a divalent radical selected from the group consisting of sulfur, nitrogen and divalent acyclic, alicyclic, aromatic and heterocyclic radicals.

14. A cured rubbery composition of matter consisting essentially of, per 100 parts of a chlorinated copolymer of between about 85 and about 99.5 wt. percent of isobutylene and between about 15 and about 0.5 wt. percent of isoprene, between about 0.2 and about 20 parts of zinc oxide and between about 0.2 and about 20 parts of N,N'-m-phenylene bismaleimide, said rubbery composition having been cured at a temperature of between about 250° F. and about 450° F. for between about 10 minutes and about 3 hours.

15. A process for preparing a cured rubbery composition which consists essentially of admixing, per 100 parts of a halogenated copolymer of between about 85 and about 99.5 wt. percent of a $C_4$-$C_8$ isoolefin and between about 15 and 0.5 wt. percent of a $C_4$-$C_{14}$ multiolefin, between about 0.2 and about 20 parts of an organic compound containing at least two N-substituted maleimido radicals per molecule and curing the resultant admixture at a temperature of between about 250° F. and about 450° F. for between about 10 minutes and about 3 hours.

16. A process according to claim 15 wherein the organic multimaleimide compound is represented by the formulae:

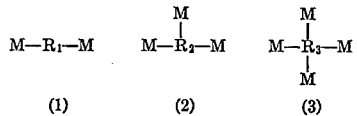

wherein M is the N-substituted maleimido radical

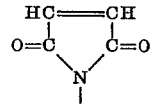

$R_1$ is a divalent radical selected from the group consisting of sulfur, nitrogen and divalent acyclic, alicyclic, aromatic and heterocyclic radicals, and $R_2$ and $R_3$ are respectively trivalent and tetravalent organic radicals selected respectively from the group consisting of trivalent and tetravalent acyclic, alicyclic, aromatic and heterocyclic radicals.

17. A process according to claim 15 wherein the organic multimaleimide compound is N,N'-m-phenylene bismaleimide.

18. A process according to claim 15 wherein the isoolefin is isobutylene and the multiolefin is isoprene.

19. A process according to claim 15 wherein the halogenated isoolefin-multiolefin copoylmer is selected from the group consisting of chlorinated and brominated copolymers of between about 85 and about 99.5 wt. percent of a $C_4$–$C_8$ isoolefin and between about 15 and about 0.5 wt. percent of a $C_4$–$C_8$ diolefin and wherein said halogenated copolymer contains at least 0.5 wt. percent of combined halogen and wherein the amount of halogen and the halogen are correlated and selected from the group consisting of not more than about 1 atom of combined chlorine per double bond in the copolymer and not more than about 3 atoms of combined bromine per double bond in the copolymer.

20. A process according to claim 19 wherein the organic multimaleimide compound is represented by the formula, M—$R_1$—M, wherein M is the N-substituted maleimido radical,

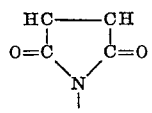

and $R_1$ is a divalent radical selected from the group consisting of sulfur, nitrogen and divalent acyclic, alicyclic, aromatic and heterocyclic radicals.

21. A process for preparing a cured rubbery composition which consists essentially of admixing, per 100 parts of a chlorinated copolymer of between about 85 and about 99.5 wt. percent of isobutylene and between about 15 and about 0.5 wt. percent of isoprene, between about 0.2 and about 20 parts of zinc oxide and between about 0.2 and about 20 parts of N,N'-m-phenylene bismaleimide, and curing the resultant admixture at a temperature of between about 250° F. and about 450° F. for between about 10 minutes and about 3 hours.

References Cited
UNITED STATES PATENTS

| | | | |
|---|---|---|---|
| 2,925,407 | 2/1960 | Goldberg | 260—773 |
| 2,958,672 | 11/1960 | Goldberg | 260—884 |
| 2,989,504 | 6/1961 | Little | 260—85.3 |
| 3,153,014 | 10/1964 | Fletcher et al. | 260—85.3 |
| 3,219,091 | 11/1965 | Iknayan et al. | 260—887 |

MURRAY TILLMAN, *Primary Examiner.*

M. J. TULLY, *Assistant Examiner.*